Sept. 15, 1942.   G. DALKOWITZ   2,296,093
SHAVING DEVICE
Filed June 22, 1937

INVENTOR
GODFREY DALKOWITZ
BY
ATTORNEY

Patented Sept. 15, 1942

2,296,093

UNITED STATES PATENT OFFICE 2,296,093

SHAVING DEVICE

Godfrey Dalkowitz, Brooklyn, N. Y., assignor to American Safety Razor Corporation, Brooklyn, N. Y., a corporation of Virginia Application June 22, 1937, Serial No. 149,567

2 Claims. (Cl. 30—43)

My invention in general relates generally to shaving devices functioning without the use of detergents or the like and generally referred to as dry shavers, and more particularly, to a device in which there is employed a stationary shearing plate slotted for the purpose of receiving and guiding hairs and a cutter which moves in the direction of the slots to shear off hairs so received in the slots.

Among the more important objects of my invention are as follows: the provision in a shear plate of cutting edges directed generally longitudinally of the shear plate and spaced laterally of each other across the shear plate and a cutter moving across the shear plate to cooperate with the cutting edges; the provision in a shear plate of a central section having cutting edges on opposite sides thereof and directed longitudinally of the shear plate and a cutter movable across the shear plate to cooperate with the cutting edges; the provision in a shear plate of a central section having two sets of cutting edges on opposite sides thereof and directed generally longitudinally of the shear plate and a cutter movable across the shear plate to cooperate with the cutting edges; the provision in a shear plate of a central section having two sets of cutting edges on opposite sides thereof, and directed generally longitudinally of the shear plate, the cutters of each set being spaced longitudinally of each other and in alignment and a cutter movable across the shear plate to cooperate with the cutting edges; the provision in a shear plate of a central section and two sets of cutting edges on the side edges thereof, the edges of one side alternating with the edges of the other set; the provision of a slotted shear plate and a cutter movable in the direction of the slots, of a reinforcing rib depending from shear plate and received within a recess of the cutter; the provision of a shear plate having two sets of slots all extending generally in the same direction, the slots of one set alternating with the slots of the other set, a cutter moving in the direction of the slots and cooperating with both sets to cut hair in such movement and a flange depending from the shear plate for reinforcing it, said flange being received in a recess in the cutter as the cutter moves to cooperate with both sets of slots; the provision of a shear plate having a central section, sets of cutting edges on each side thereof and a plurality of cutters moving in unison but in spaced relation and cooperating with said sets of cutting edges in the shear plate, a dry shaver comprising a shear plate and a cutter mounted for movement about a pivot and means for pivoting the cutter comprising a casing slidably received within the stationary cutter; a dry shaver comprising a shear plate and a cutter mounted for movement about a pivot and means for pivoting the cutter comprising a casing slidably received within the stationary cutter and means for yieldingly urging said casing in the direction of the stationary cutter.

The general object of my invention is the provision in a new, useful, inexpensive and effective arrangement for shaving without the requirement for lather and the like.

For the attainment of these objects and such other objects as will hereinafter appear or be pointed out I have shown one illustrative embodiment of my invention in the drawing, in which.

Figure 1:
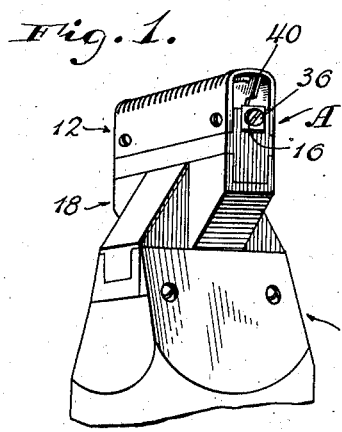
Figure 1 is a perspective view of a shaving head according to my invention in place on a handle.

In Figure 1 I have shown a shaving head constructed in accordance with my invention and denoted generally by A and this head is shown in place on a handle denoted generally by B, and which may contain a source of motive power whereby the parts of the shaving head may be activated.

Figure 2:
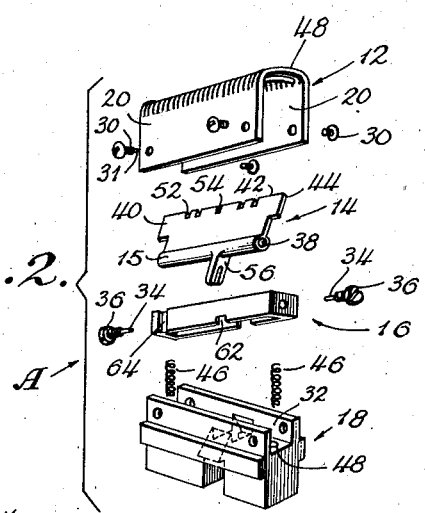
Figure 2 is an exploded view of the parts constituting the shaving head of Figure 1.
Figure 3:
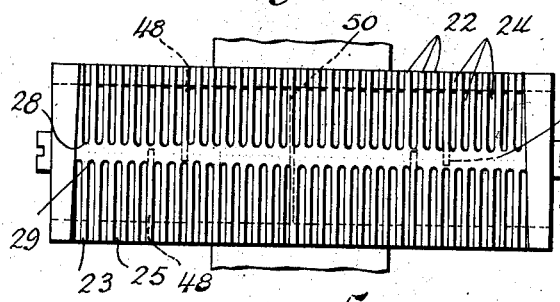
Figure 3 is a plan view of the slotted shear plate of the shaving head of Figure 1.

On referring to Figure 2 which is an exploded view of the various parts constituting my shaving head it will be observed that the same comprises a guard or shear plate denoted generally by 12, a cutter 14, a cutter carrier 16 and a base block 18.

Before proceeding with a description of the details of these parts I will state that in general the guard plate is shown as comprising spaced cutting edges arranged in rows, which may be referred to as fixed cutting edges, and which cooperate with cutting edges on the cutter, which are movable across the fixed cutting edges so as to effect the shaving action. The cutter 14 is shown as mounted for movement within the cutter carrier 16, and the latter in turn is slidably mounted in the base block 18, and means are provided in connection with the cutter carrier 16 for assuring contact of the cutter edges of the cutter with the cutting edges of the shear plate.

Figure 4:
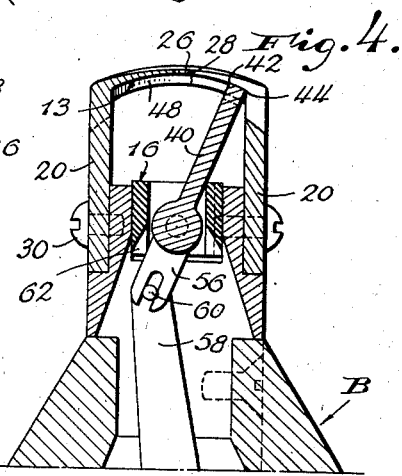
Figure 4 is a transverse sectional view through the shaving head.

The cutter 14 is shown as pivotally mounted within the cutter carrier 16, as appears clearly from Figures 2 and 4, and the shear plate 12 is shown as provided with an arcuate inner surface 13 (see Figure 4) with which the cutter 14 is at all times in contact during its pivotal movement and which arcuate portions carry the aforesaid fixed cutting edges. The arcuate portions are shown at the top of the shear plate which is provided with lateral dependent side portions 20, whereby the whole is given a U-shaped cross section. The arcuate portion is shown as constituted by a plurality of transverse ribs 22 and 23 separated from each other respectively by slots 24 and 25 and the slots and ribs are shown as extending outwardly on both sides of a member 26 running longitudinally of the shear plate toward and into the side portions 20 and as terminating below the upper edges of the side portions. The inner end walls of the slots are formed with cutting edges 28 and 29 positioned respectively on opposite sides of the member 26, and it will be observed that the cutting edges 28 are staggered in relation to the cutting edges 29, and the same of course is true of the ribs 22 and 23 and the slots 24 and 25.

As a result of this construction the cutter moves in the direction of the slots and across the cutting edges 28 and 29, while the staggered arrangement of the ribs 22 and 23 assures a distribution of the wear on the cutter.

The shear plate 12 is shown as carried on the base block 18, being secured thereto in any suitable or preferred manner (as for example by the screws 30), and in the hollow space between these members is positioned the cutter 14 which is pivotally mounted within the cutter carrier 16, which latter, as has already been stated, is movably mounted within the base block 18 and for this purpose the latter is shown as provided with a recess 32 within which the cutter carrier 16 may slide, and the cutter carrier 16 is shown as provided with a pair of trunnions 34 formed on the ends of a pair of screws 36 positioned one at each end of the carrier 16, while the cutter 14 is shown as provided with bores 38 adapted to receive the said trunnions 34. Projecting outwardly from the body portion 15 of the cutter 14 is a cutting blade 40 provided with cutting edges 42 and 44 adapted to contact the inner face of the shear plate.

It will be observed that each of the cutting edges 42 and 44 is effective only in one direction of motion and with only one set of cutting edges 28 and 29. For instance, in Figure 4 the cutting edge 42 will coact with edges 28, as it moves to the left but will not coact with edges 29 at any time, nor with edges 28 on its return stroke to the right. On the other hand, for similar reasons, the cutting edge 44 coacts only with cutting edges 29 and then only on movement toward the right as in Figure 2.

Projecting downwardly from the body portion 15 of the cutter 14 is a slotted extension 56 by means of which an oscillating movement may be imparted to the cutter by any suitable or preferred means, such as by the oscillating or reciprocating lever 58 carrying a pin 60 which is slidable in the slot of the extension 56. In order to insure freedom of movement of the extension 56 without unduly enlarging the size of the cutter carrier 16 the latter may be slotted on its underside as indicated at 62, and thereby the cutter is enabled to move through a relatively wide arc.

In order to hold the cutter carrier 16 against endwise movement it is shown as having a slot 64 in the side thereof into which may project the end of one of the screws 30, this screw being made of extra length for this purpose as indicated in the upper left hand portion of Figure 2 by the numeral 31.

For purposes of securing contact between the cutting edges 42 and 44 and the inner surface of the shear plate, and in particular of the cutting edges 28 and 29 of the shear plate, I have shown a pair of coil springs 46 positioned in recesses 48 in the base block and adapted to press against the lower surface of the cutter carrier 16, whereby the latter will tend to move upward, carrying with it the cutter 14.

Figure 5:
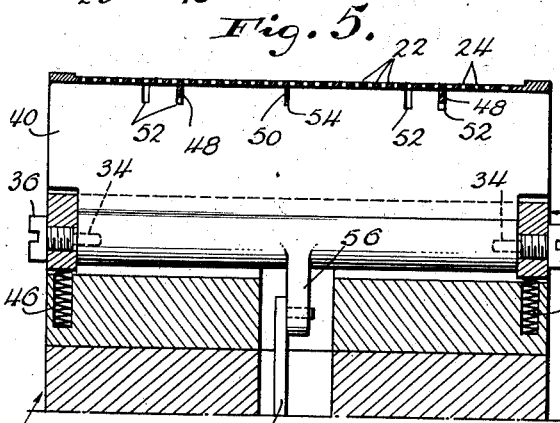
Figure 5 is a longitudinal sectional view through the shaving head.
Figure 6:
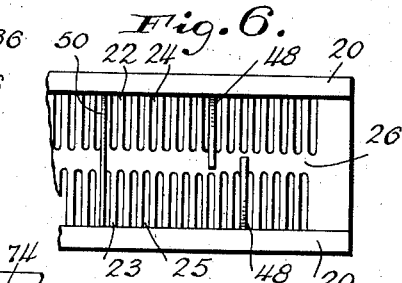
Figure 6 is a bottom plan view of the shear plate.

As can be clearly seen from Figure 4, as well as from Figure 5, the member 26 is relatively thin, so that its inner surface on which the cutting action takes place will be positioned very close to the surface to be shaved which is desirable since thereby a "close shave" may be effected. Since the cutting action takes place entirely in this region it is unnecessary for the same degree of thinness to be maintained at the other portions of the shear plate, and although these have been shown as also comparatively thin, it is to be understood that if desired I may make the outer surface of the shear plate of a lesser degree of curvature than the inner surface, or may make it flat or even concave, and that in all of these constructions the thickness of the shear plate or of the ribs 22 would increase outwardly from the member 26, which latter may remain as thin as desired.

In view of the fact however that for certain purposes it may be desirable to have the shear plate thin throughout its arcuate portion, as, for example, where the member 12 is formed of sheet material, I have shown reinforcing ribs applied to the underside of the shear plate, as shown at 48 and 50, and these reinforcing ribs are shown as of two types, one type extending inwardly from the side members 20 and terminating beneath the member 26, and the other type 50 running entirely across the shear plate. The type of rib 48 possesses the advantage that it may be made as thick as one of the ribs 22 or 23 without obstructing the slots 24 or 25 and thereby interfering with the regular slot pattern. The type of rib 50 on the other hand either must be made very thin or must be built laterally out into the slots 24 or 25, thereby narrowing the same and disturbing the regular slot pattern.

In order to permit action of the cutter the upper edge of the cutter blade is slotted as shown at 52 and 54, the latter type of slot being adapted to receive the rib 50 throughout the movement of the cutter 14, whereas each of the slots 52 engages one of the ribs 48 only during approximately one half the movement of the cutter 14.

Figures 7, 8:
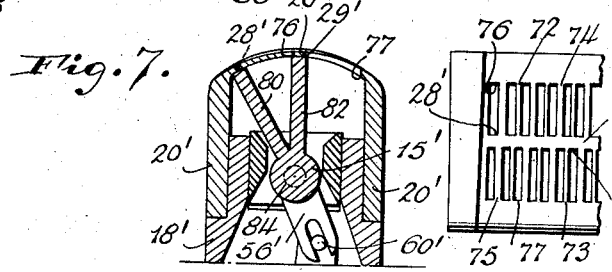
Figure 7 is a view similar to Figure 4 of a modified form.
Figure 8 is a plan view of part of the shear plate of Figure 7.

In Figure 7 I have shown a modified form of my invention in which instead of a single cutting blade I have shown two cutting blades carried in fixed relation on the pivoted member, and each of these blades cooperate with two sets of cutting edges to effect the shaving action.

The shear plate of this construction is shown as formed similarly to the shear plate 12, having side portions 20' and an arcuate upper portion provided with alternating slots and ribs, which are also shown as staggered and as extending outwardly from opposite sides of a central member 26'. By referring to Figure 8 it will be observed that the ribs of each of the two sides are shown as of two types, one wider than the other and the two types are arranged in alternation. 72 and 74 indicate respectively the narrow and the wide ribs disposed on one side of the member 26' and 73 and 75 indicate respectively the narrow and the wide ribs disposed on the other side of the central member 26' and it will be observed that the ribs of the respective sides are again arranged in staggered relation so that the cutting edges 28' and 29' formed on the opposite sides of the member 26' are also arranged in staggered relation. Instead of a single set of cutting edges comprising the cutting edges 28' and 29' positioned on the inner walls of the slots, however, I have shown on the opposite end of each of the slots a second cutting edge. These are indicated at 76 and 77 and are disposed on the arcuate portion of the guard member, so that they may coact with the cutting edges of the cutters.

By referring to Figure 7 it will be noted that the cutters 80 and 82 are carried by a member 15' similar to the portion 15 of the previous embodiment, which is trunnioned as indicated at 84, and may be actuated by the movement of pin 60' within the slotted arm 56'. However the movement of each cutter is limited to approximately one-half of the area of the arcuate portion of the shear plate, so that the cutter 80 engages only the cutting edges 28' and 76 whereas the cutter 82 engages only the cutting edges 29' and 77. As before each of the two cutting edges of the cutters coacts with only one fixed cutting edge.

While I have herein illustrated and described two embodiments of my invention it will be understood that my invention may be embodied in many other forms and may be modified as to the details thereof, as will be readily understood by those skilled in the art without departing from the spirit thereof, and that the disclosure herein is by way of illustration only and is not to be interpreted in a limiting sense, and that I do not limit myself in any way other than as called for by the prior art.

Having thus described my invention and illustrated its use, what I claim as new, and desire to secure by Letters Patent is:

1. In a dry shaver, a shear plate having a longitudinally extending central solid portion and solid bars extending outwardly from said central solid portion on each side thereof, the bars on one side being staggered in relation to the bars on the other side, and at least one rib extending transversely across the shear plate and depending downwardly from a pair of said bars on opposite sides of said central solid portion and other ribs extending transversely part of the way across said shear plate.

2. In a dry shaver, an arched shear-plate having a central longitudinally extending solid portion and slotted portions on each side of said central portion, the slots of said slotted portions being defined by elongated bars running outwardly from said central portion on either side thereof, and a reinforcing rib having a portion depending from one of said bars and a portion depending from said central solid portion but not extending therebeyond.

GODFREY DALKOWITZ.